US011056867B2

(12) United States Patent
Obrist et al.

(10) Patent No.: US 11,056,867 B2
(45) Date of Patent: Jul. 6, 2021

(54) INSTALLATION APPARATUS CONSISTING OF A WALL PLUG AND A HOLDER WHICH CAN BE SCREWED THEREIN FOR INSTALLING FLUSH-MOUNTED DEVICES

(71) Applicant: OBLAMATIK AG, Chur (CH)

(72) Inventors: Roland Obrist, Scharans (CH); Daniel Knupfer, Trimmis (CH)

(73) Assignee: OBLAMATIK AG, Chur (CH)

( * ) Notice: Subject to any disclaimer, the term of this patent is extended or adjusted under 35 U.S.C. 154(b) by 47 days.

(21) Appl. No.: 16/605,460

(22) PCT Filed: Apr. 18, 2017

(86) PCT No.: PCT/EP2017/059173
§ 371 (c)(1),
(2) Date: Nov. 27, 2019

(87) PCT Pub. No.: WO2018/192638
PCT Pub. Date: Oct. 25, 2018

(65) Prior Publication Data
US 2021/0126444 A1    Apr. 29, 2021

(51) Int. Cl.
*H02G 3/12* (2006.01)
*H02G 3/18* (2006.01)
(52) U.S. Cl.
CPC ............... *H02G 3/123* (2013.01); *H02G 3/18* (2013.01)
(58) Field of Classification Search
CPC ............ H02G 3/123; H02G 3/18; H02G 3/10; H02G 3/12; H02G 3/121; H02G 3/24;
(Continued)

(56) References Cited

U.S. PATENT DOCUMENTS 4,626,620 A * 12/1986 Plyler .................... H02G 3/083
174/153 G
5,144,777 A * 9/1992 Fishel .................... A47B 21/06
16/2.1
(Continued)

FOREIGN PATENT DOCUMENTS

DE         4427769 A1    2/1996
WO      03081054 A1    10/2003
WO   2015118241 A1     8/2015

OTHER PUBLICATIONS

International Preliminary Report on Patentabilility and Written Opinion for corresponding PCT application No. PCT/EP2017/059173, dated Oct. 31, 2019.
(Continued)

*Primary Examiner* — Angel R Estrada
(74) *Attorney, Agent, or Firm* — Notaro, Michalos & Zaccaria P.C.

(57) ABSTRACT

An installation device for installing flush-mounted fixtures on/in a wall, where the installation device has a wall plug and a retainer that can be screwed therein. The wall plug and the retainer have a sleeve-shaped body, and a relative rotation between the wall plug and the retainer in a first direction of rotation leads to a reduction in the distance between a first free end and a second free end of the wall plug, and that a relative rotation between the wall plug and the retainer in a second direction of rotation, opposite the first, leads to an increase in the distance between the first free end and the second free end of the wall plug.

14 Claims, 7 Drawing Sheets

(58) Field of Classification Search
CPC ... H02G 3/26; H02G 3/30; H02G 3/22; B60R 16/0222; B60R 16/0207; F16L 5/00; F16L 5/02
USPC ........ 174/480, 481, 152 G, 153 G, 135, 151, 174/650, 651, 137 R, 138 R, 142, 152 R, 174/153 R, 668; 248/68.1, 49; 16/2.1, 16/2.2
See application file for complete search history.

(56) References Cited

U.S. PATENT DOCUMENTS

| | | | | |
|---|---|---|---|---|
| 5,160,809 | A * | 11/1992 | Yang | H02G 3/185 174/481 |
| 6,694,566 | B1 * | 2/2004 | Mockett | A47B 21/06 108/50.02 |
| 7,060,899 | B1 * | 6/2006 | Hoefer | H02G 1/00 16/2.1 |
| 9,024,211 | B2 * | 5/2015 | Stathis | A47B 97/00 174/650 |
| 9,748,709 | B2 * | 8/2017 | Byrne | H01R 13/746 |

OTHER PUBLICATIONS

International Search Report for corresponding PCT application No. PCT/EP2017/059173, dated Jan. 22, 2018.

* cited by examiner

INSTALLATION APPARATUS CONSISTING OF A WALL PLUG AND A HOLDER WHICH CAN BE SCREWED THEREIN FOR INSTALLING FLUSH-MOUNTED DEVICES

TECHNICAL FIELD

The present invention relates to an installation device for installing flush-mounted fixtures.

PRIOR ART

With flush-mounted installation, flush-mounted sockets, flush-mounted switches, flush-mounted control units, or flush-mounted telephone outlets, flush-mounted antenna outlets, flush-mounted dimmers, flush-mounted thermostats, and so-called outlet sockets, are used for installing flush-mounted fixtures. There are various designs for outlet sockets, wherein the simplest form is in the shape of a socket, and has a uniform diameter above the depth of the socket. Outlet sockets are normally made of plastic and have screw heads to which fixture inserts can be attached.

Such outlet sockets take up a lot of space and are difficult to install. Furthermore, different sockets are used in different types of walls, e.g. solid walls (e.g. with plaster surfaces or coated with plates) or hollow walls (e.g. plaster walls or lightweight walls). A retaining or securing plate is attached to the flush-mounted socket with small screws for the installation, to which a cover plate and/or decorative plate is attached.

DESCRIPTION OF THE INVENTION

The object of the invention is to create a space-saving and easily installed installation device for installing flush-mounted fixtures.

This object is achieved by a device that has the features of claim 1. Further embodiments of the installation device, and installation system, and an installation method are defined by the features of the other claims.

An installation device according to the invention for installing flush-mounted fixtures on or in a wall comprises a wall plug and a retainer that can be screwed therein.

The wall plug has a sleeve-shaped body extending along a first longitudinal axis that has a first free end, a second, opposite free end, and a securing section therebetween. There is a first free end surface limit stop at the first free end of the wall plug and a first tightening element at the second free end of the wall plug.

The retainer has a sleeve-shaped body extending along a second longitudinal axis that has a first free end and an opposite, second free end. There is a second limit stop on the first free end, facing the second free end, and a second tightening element on the second free end. The first limit stop and the second limit stop form a pair of limit stops.

The first tightening element and the second tightening element form a pair of tightening elements.

The securing section is configured such that a relative rotation between the wall plug and the retainer in a first direction results in a reduction in the distance between the first and second free ends of the wall plug, and a relative rotation between the wall plug and the retainer in a second, opposing direction results in an increase in the distance between the first and second free ends of the wall plug.

The term "free end" does not refer to just the end surface of the respective element in this document, but also a region adjacent to the end surface.

The retainer can also serve as an attachment, cover, decorative cover, or seal. The retainer can also serve as a flush-mounted socket for a flush-mounted fixture. Furthermore, an empty conduit can also be attached to the retainer.

The installation device according to the invention has the advantage that it enables a compact and reliable sealing installation with only a few, easily produced, individual parts. By spreading open the securing section, a precise recess, e.g. a bore hole in the wall, in which the fixture is to be inserted, is not absolutely necessary. The fixture can thus be installed in recesses that are larger than the outer diameter of the wall plug, because the wall plug is clamped in place with the retainer. As a result, the same installation device can be used for solid walls or hollow walls. The simple principle can be used for different sized flush-mounted fixtures.

Such an installation device can be attached not only to walls but also to ceilings or floors in the same manner. The walls do not necessarily have to be the walls of a building. It is also possible to attach them to walls, ceilings or floors of vehicles such as automobiles, buses or trains, ships or airplanes, facilities or furniture. The excellent sealing properties also make it possible to use the device in sanitation regions, e.g. on shower or bathtub walls.

There is no need for a fastening plate and small screws necessary for fastening the plate with the device according to the invention. There is also no need for a cover plate or decorative cover.

In one embodiment, the wall plug and/or the retainer have a cylindrical, sleeve-shaped body. This embodiment is easy to produce and is ideal for installation in bore-holes. Alternatively, the wall plug and/or retainer can exhibit an oval, elliptical, or polygonal sleeve-shaped body.

Cross sections that are not circular tend to get twisted less, and therefore provide a safeguard against becoming skewed.

In another embodiment, the outer contour of the second free end of the retainer is smaller than the inner contour of the first free end of the securing section of the wall plug. This means that the outer diameter at the end of the retainer facing the wall plug is smaller than the inner diameter at the end of the wall plug facing the retainer and than the inner diameter of the securing section. As a result, the retainer can be easily inserted into the wall plug until the tightening element on the retainer meets the tightening element on the wall plug. The two tightening elements can then be coupled to one another by screwing the retainer into the wall plug. The wall plug and the retainer can be configured to one another such that the retainer can be rotated numerous times in the wall plug before the securing section becomes deformed.

In one embodiment, the first limit stop of the wall plug has a flange that faces outward in relation to the first longitudinal axis. The flange is a continuous flange that extends along the entire circumference, or diameter, of the wall plug. The flange can also have numerous separate sections. Alternatively, individual outward directed elements can be formed on the circumference of the wall plug. The flange, flange sections, or individual elements enlarge the stop surface on both sides of the flange in relation to the longitudinal axis. This means that the stop surfaces are enlarged in relation to the wall, and the stop surfaces are enlarged in relation to the retainer. A larger flange prevents the wall plug from being pushed too far into the hole in the wall if the hole is larger than the wall plug.

In another embodiment there are fins adjoining the first free end of the wall plug, which extend along the first longitudinal axis and/or transverse to the first longitudinal axis and/or in another arbitrary direction. Fins increase the retention of the wall plug in the hole and reduce or prevent a twisting of the wall plug in the hole. There can be numerous adjacent fins extending in the longitudinal direction, or there can be just a few fins. The outer diameter of the fins can be smaller, equal to, or larger than the outer diameter of the flange on the wall plug. By way of example, there can be numerous fins with a smaller diameter, or two fins with the same or a slightly greater diameter.

In another embodiment there are recesses in the securing section of the wall plug, which extend along the first longitudinal axis and/or transverse to the first longitudinal axis and/or in another arbitrary direction, and which are distributed about the circumference of the wall plug. The recesses reduce the stiffness of the wall plug in the securing section, such that it can be slightly deformed. Less force is therefore needed to deform the securing section, i.e. to move it out of its original position. By way of example, there can be three, four, five, six, or more such recesses, distributed evenly about the circumference of the wall plug. Fundamentally, there can be recesses of arbitrary configurations and arrangements, because these always reduce the stiffness of the wall plug in the region of the recesses.

In one embodiment the securing section of the wall plug has at least one target bending point that comprises a local recess and/or local material thinning and/or another material. The point at which the wall plug becomes deformed is determined by the target bending point. The target bending point can be in the middle of the securing section or adjacent thereto. The wall plug can be deformed in relation to its longitudinal axis, i.e. spread out, with just one target bending point. This is advantageous for installation in hollow walls. A uniform deformation of the wall plug in relation to its longitudinal axis can be obtained with numerous target bending points. This is advantageous for installation in solid walls. If the target bending point contains a different, weaker material than the rest of the wall plug, this can be the same type of material, or another type of material. The wall plugs are normally made entirely of plastic, e.g. a polyamide. Plastic wall plugs are produced in injection molding processes, which allows for a casting of plastics with different properties. Alternatively, the wall plug can be made of metal, e.g. steel, brass, etc. The wall plugs can also be made of a composite material. As a matter of course, these materials can also be combined with one another. By way of example, a metal wall plug can exhibit a plastic or rubber coating. As a result of the increased friction obtained with rubber, the wall plug is less likely to twist in the hole, because the friction between the wall and wall plug is greater than the friction between the wall plug and the retainer. The wall plug can have fins or a coating at its end facing the retainer and/or a region in the vicinity of this end, on the outer circumference thereof, increasing the friction there. The outer circumference of the securing section and the region of the tightening element have lower frictions. The friction between the wall plug and the retainer can be intentionally increased to a certain extent in the tightening elements, such that the wall plug twists the retainer slightly when it is rotated, thus resulting in a greater clamping.

In another embodiment, the second limit stop of the retainer has a flange that faces outward in relation to the second longitudinal axis. The contact surface with the wall increases in accordance with the increase in size of the flange. A larger flange can also cover a larger hole.

In another embodiment there is a groove for a seal in the flange on the retainer on its side facing toward the second end. Plastic seals, e.g. ring seals made of foam rubber are normally used in order to prevent ingress of moisture. Other commercially available seals can also be used with the device as well. With a retainer made of plastic, produced in a injection molding process, the seal can be cast directly onto the retainer. The circumferential seal in the flange results in a seamless circumferential seal between the flange and the wall. The installation device can therefore be safely used in wet areas.

In one embodiment, there is a fastener for a flush-mounted fixture on the first free end of the retainer. By way of example, this can be a threading, a bayonet socket, or a plug-in connection with a latching element. This allows for a multifaceted installation of different flush-mounted fixtures.

In another embodiment, the pair of tightening elements forms a threaded connection or a bayonet socket connection. A threaded connection allows for the installation device to be drawn in smoothly, or the securing section to be deformed smoothly. This is advantageous if the installation conditions change or cannot be anticipated. The outer thread on the retainer can only extend over an edge region of the second end. Alternatively, it can extend one half, two thirds, three quarters, or more, of the distance to the flange. The threading on the retainer is longer than the threading on the wall plug. The internal thread on the wall plug should fundamentally extend more than at least twice the thread pitch, in order that the threading does not become stripped when tightening the retainer in the wall plug. Three, four, five, or more times the thread pitch is also an option.

A bayonet socket simplifies the installation when the installation conditions are constant and can be anticipated. The desired clamping force can thus be obtained in a lightweight wall through the design of the bayonet socket. This makes it impossible to tighten the installation device too much, such that the wall becomes damaged.

In order to reinforce the threaded region of the wall plug, the wall plug can be thicker in this region, or provided with a stronger material. By way of example, this can be obtained with a more sturdy plastic or a metal ring into which the thread is cut. Fewer thread windings are necessary to ensure that the thread does not become stripped when tightened if a metal ring is used. This makes it possible to shorten the wall plug.

There can be retaining elements on the outer surface of the wall plug, e.g. in the form of upright fins, which prevent the wall plug from slipping out of the recess in the wall. The upright fins also enlarge the contact region with the inner surface of the wall, e.g. in a hollow wall, and enable greater retaining forces to be applied to the inner surface of the wall, without additionally loading the wall locally. Instead of individual fins, the retaining element can also be a continuous circumferential collar. The design of the retaining element should be selected such that when the wall plug is inserted into the recess in the wall, it bears on the wall plug, and when it is pulled out, they spread out and become wedged against the surrounding wall.

In one embodiment, an inward flange in relation to the second longitudinal axis on the second free end of the retainer is provided with a recess in the form of a hexagonal socket. As a result, it is not necessary to provide anything on the retainer that enables the retainer to be tightened onto the wall plug. The visible portion of the retainer after installation can thus have an arbitrary design, without having to take into account any tightening elements. The hexagonal socket enables the use of a larger tool, making it easier to tighten and preventing or reducing a stripping or damaging of the contour. A larger through hole in the retainer also facilitates the insertion of cables. Other shapes, e.g. triangular, square, or star-shaped sockets can also be used. Alternatively, the retainer can have recesses on the end surface. A tool can engage in these recesses, by means of which the retainer can be screwed into the wall plug. Instead of recesses, the retainer can also have projections on the end surface. In another alternative, there can be structures in the interior of the retainer, i.e. recesses, projections, or a combination thereof, in which a tool can engage. The recesses or projections can be distributed evenly or arbitrarily on the circumference. All of the structures on the end surface or in the interior that enable a tool to be inserted in the direction of the longitudinal axis 20 can be used.

The specified embodiments of the installation device can be used in arbitrary combinations, as long as they are not contradictory.

An installation system according to the invention comprises the installation device described above, and a flush-mounted fixture therein. The flush-mounted fixture is normally placed in the retainer and the retainer extends laterally beyond the fixture. It is also possible to place fixtures in the retainer that extend laterally beyond the retainer. It is also possible to use fixtures with seals, wherein the fixture seal also bears on the wall where the system is installed. As a result, a double seal can be obtained between the environment and the recess in the wall, thus increasing protection against the ingress of moisture. Alternatively, the seal on the retainer can be omitted, in order to save the costs for the groove and the seal.

An installation method according to the invention for an installation device according to the invention on a wall comprises the following steps:
  inserting the wall plug into a recess in a wall;
  placing the retainer on the wall plug prior to or after inserting the wall plug into the recess in the wall; and
  rotating the retainer in relation to the wall plug, reducing the distance between the first and second free ends of the wall plug.

The placement of the retainer in the wall plug can comprise the insertion, or the insertion and rotation of the retainer in the wall plug.

BRIEF DESCRIPTION OF THE DRAWINGS

Exemplary embodiments of the present invention shall be explained in greater detail below in reference to the figures. These serve merely for purposes of explanation and are not to be interpreted as limiting. Therein.

DETAILED DESCRIPTION OF THE INVENTION

Figure 1:
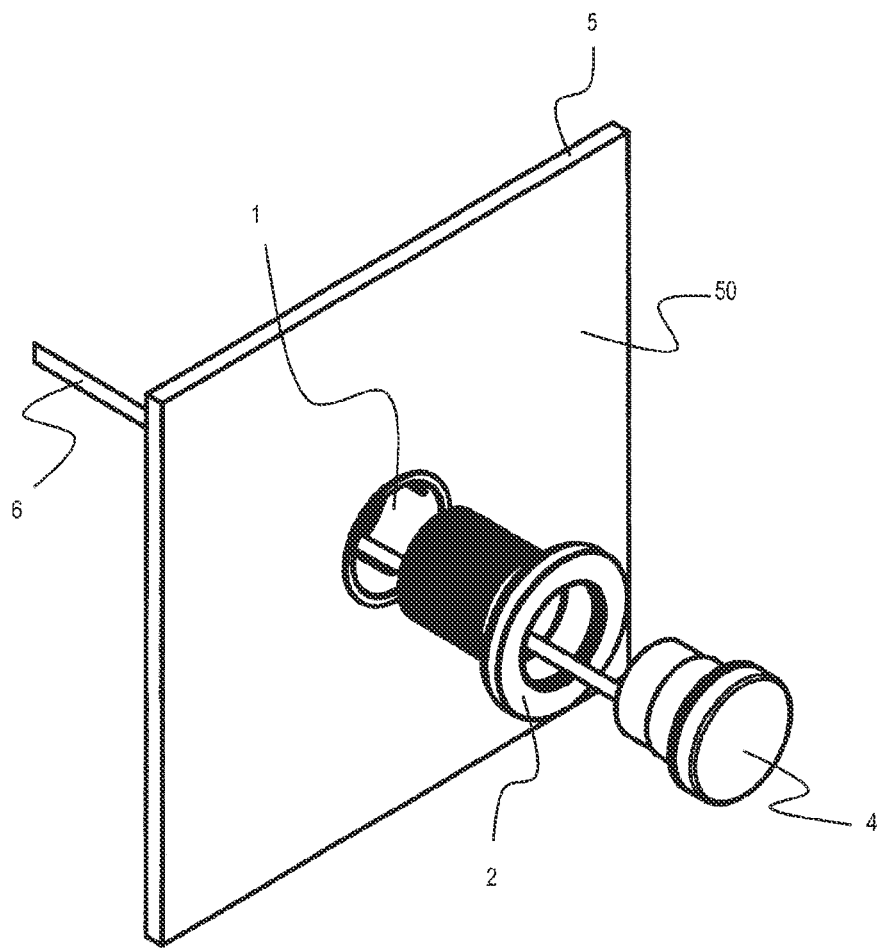
FIG. 1 shows a perspective exploded view of an installation system according to the invention for a flush-mounted device.

FIG. 1 shows a perspective exploded view of an installation system according to the invention for installing a flush-mounted fixture 4 on a wall 5. A wall plug 1 is inserted in the wall 5 until it is substantially flush with the surface 50 of the wall. A retainer 2 can be placed in the wall plug 1, concentric thereto. A flush-mounted fixture 4 can be placed in the retainer 2, concentric thereto. Electrical or control cables 6 can be fed through the wall plug 1 and the retainer 2 to the flush-mounted fixture 4, and connected electrically thereto.

Figure 2:
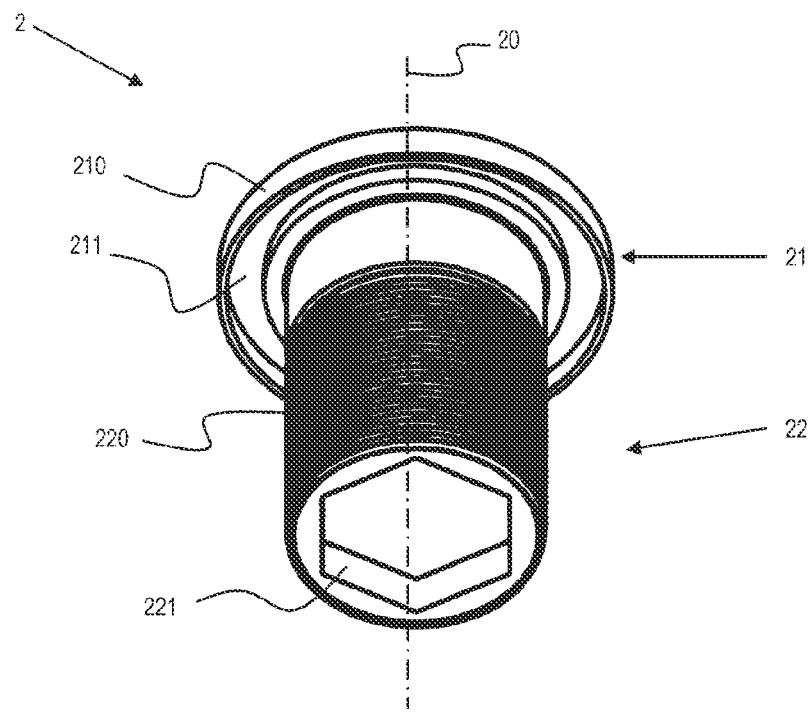
FIG. 2 shows a perspective view of a retainer for an installation device according to the invention.
Figure 4:
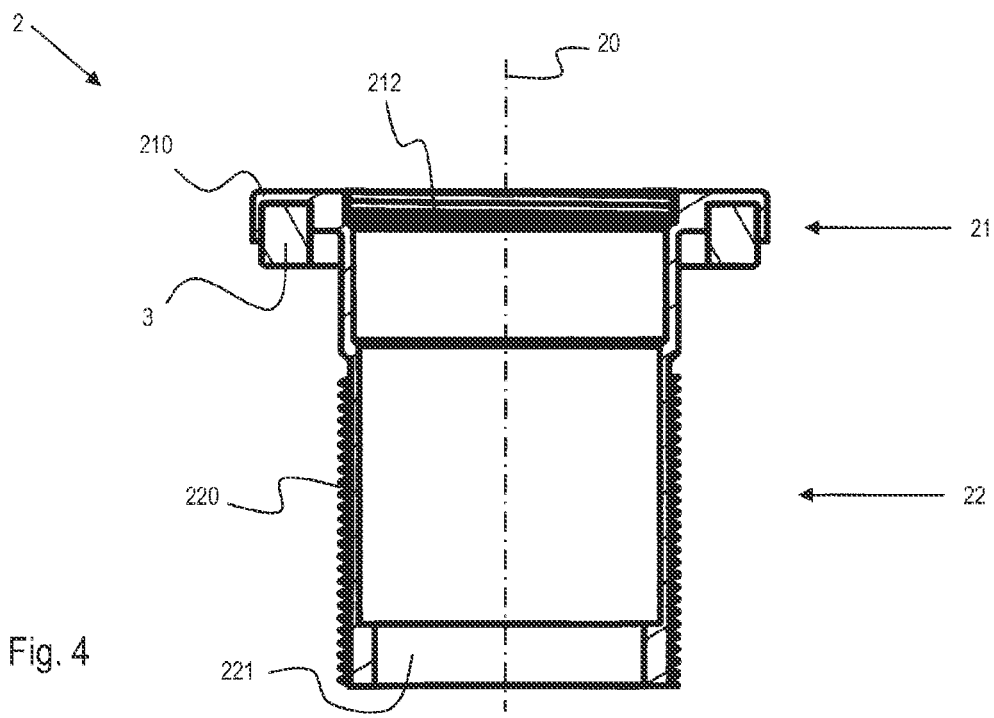
FIG. 4 shows a lateral sectional view of the retainer shown in FIG. 2, with a seal.

FIG. 2 shows a perspective view of a retainer 2 for an installation device according to the invention and FIG. 4 shows a lateral sectional view of the retainer in FIG. 2 with a seal 3 placed therein.

The retainer 2 has a sleeve-shaped cylindrical body that extends along a second longitudinal axis 20. The retainer has a first free end 21 and an opposite second free end 22. There is a flange 210 on the first free end 21 that projects outward in relation to the second longitudinal axis 20. There is a continuous circumferential groove 211 for a seal on the side of the flange 210 facing the second end 22, e.g. for a flat ring seal. This flange surface forms the limit stop for the wall plug 1 in the intended position for use. It also forms a sealing surface with respect to the wall 5. There is a threading 220 at the second free end 22, which extends along the longitudinal axis 20 from the end surface at the front to the first free end 21. The threading 220 extends approximately over three quarters of the part of the retainer 2 formed between the flange 210 and the end surface at the front. The front end surface is part of an inward flange, which has an internal recess in the form of a hexagonal socket 221.

Figure 3:
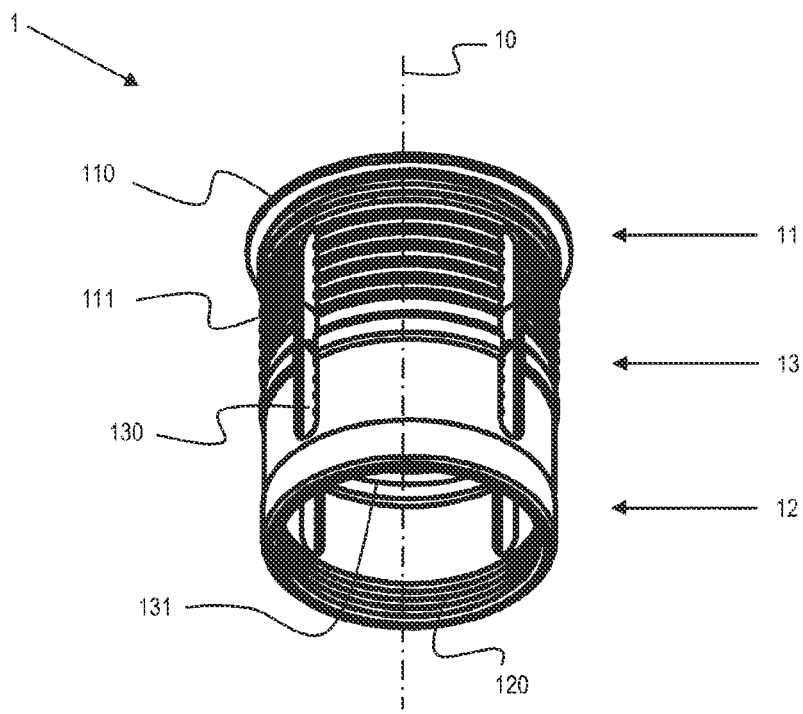
FIG. 3 shows a perspective view of a wall plug for an installation device according to the invention.
Figure 5:
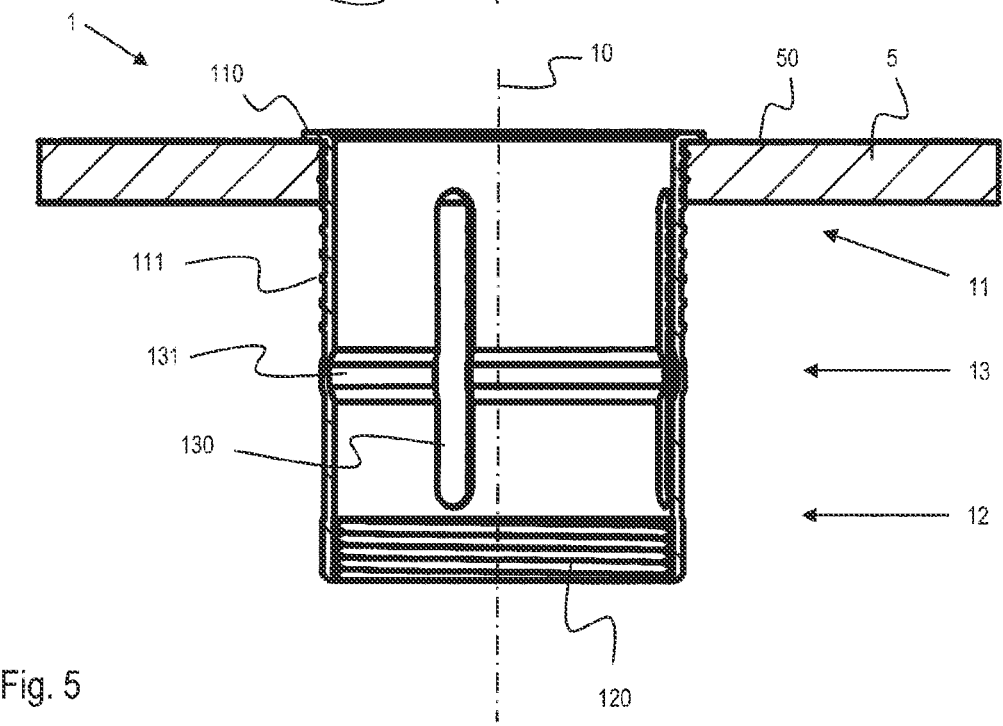
FIG. 5 shows a lateral sectional view of the wall plug shown in FIG. 3, placed in a wall.

FIG. 3 shows a perspective view of a wall plug 1 of an installation device according to the invention and FIG. 5 shows a lateral sectional view of the wall plug in FIG. 3, placed in a wall. The wall plug 1 has a sleeve-shaped cylindrical body that extends along a first longitudinal axis 10. The wall plug 1 has a first free end 11 and an opposite, second free end 12, and a securing section 13 lying therebetween. An outward flange 110 in relation to the longitudinal axis 10 is formed on the first free end 11. The front end surface of the wall plug at the first free end 11 forms a limit stop for the retainer 2. The side of the flange 110 facing the second end 12 forms a limit stop against the surface 50 of the wall 5. Adjoining the flange 110, there are fins 111 on the outside of the wall plug 1. In the illustration there are numerous fins 11 distributed evenly in the longitudinal direction. The region with the fins extends to approximately one half of the coating surface of the wall plug adjoining the flange 110. The outer diameter of the fins 111 is smaller than the outer diameter of the flange 110.

There are recesses 130 in the securing section 13 of the wall plug 1, which extend substantially over the entire securing section 13 along the first longitudinal axis 10. Four recesses 130 are evenly distributed over the circumference.

Figure 7:
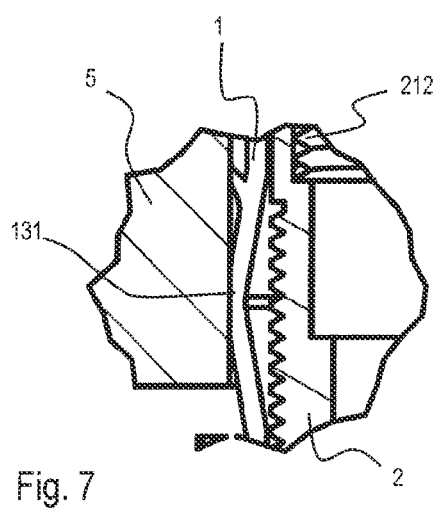
FIG. 7 shows a detail of the target bending point of the system shown in FIG. 6.

There is a target bending point 131 adjoining the finned region. The target bending point is basically in the middle of the region of the wall plug extending between the flange 110 and the front end surface of the second free end 12. FIG. 7 shows a detail of the target bending point 131 in the assembled state. The target bending point 131 has a local curvature in the sleeve-shaped body of the wall plug 1. The curved part, i.e. the part extending away from the first longitudinal axis 10 over the coating surface of the sleeve, also has a material thinning, i.e. the wall of the wall plug 1 is thinner in this region than in the adjoining regions.

A threading 120 is formed in the region of the second free end 12 of the wall plug 1 on the inside of the sleeve, i.e. on the side of the sleeve-shaped body facing the longitudinal axis 10. The threading 120 extends from the front end surface toward the longitudinal axis 10 to the recesses 130 in the securing section 13. In the embodiment shown, the threading 120 extends over 5 windings toward the longitudinal axis 10.

Figure 6:
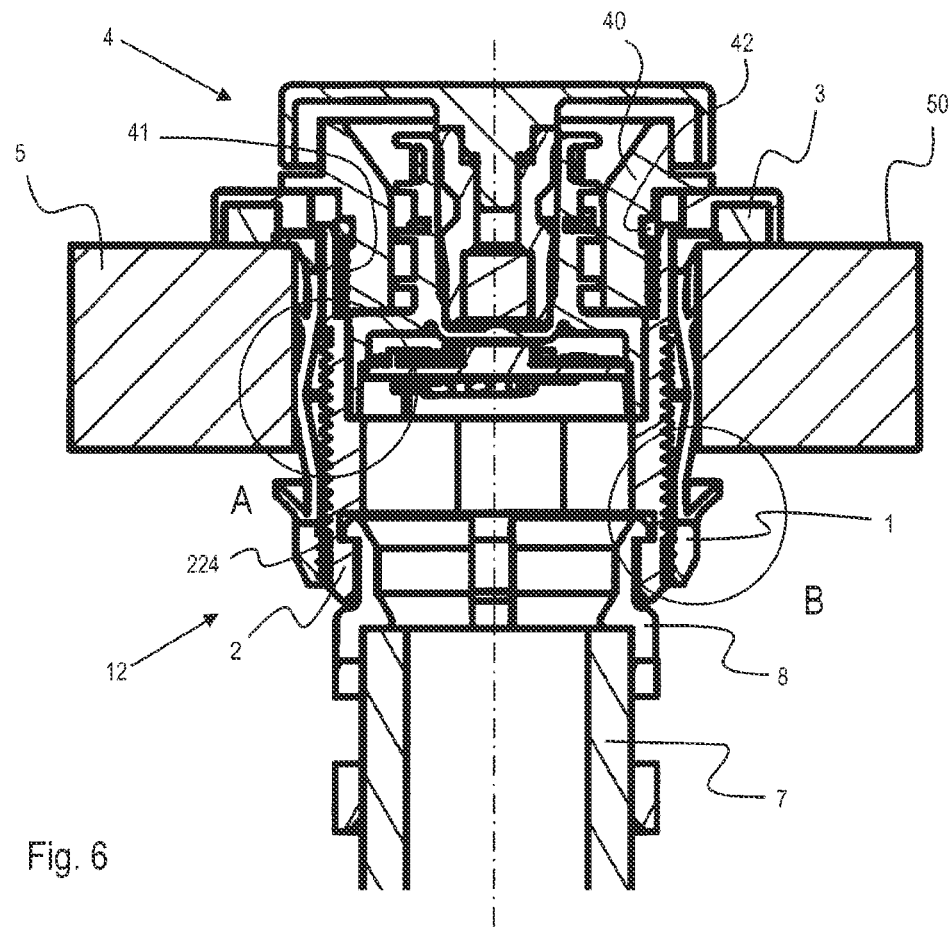
FIG. 6 shows a lateral sectional view of an installation system according to the invention in the assembled state, with an empty conduit.
Figure 8:
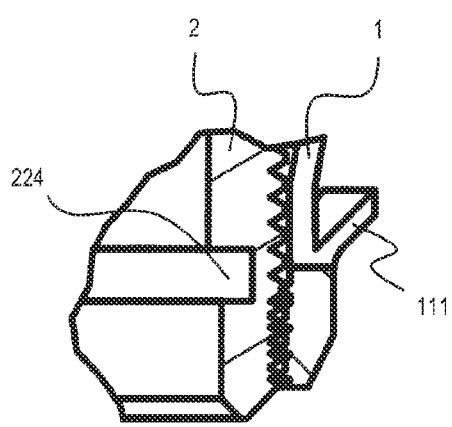
FIG. 8 shows a detail of the retaining element of the system shown in FIG. 6.

FIG. 6 shows a lateral sectional view of an embodiment of an installation system according to the invention in the assembled state. The wall plug 1 sits concentrically in the hole in the wall 5 and the retainer 2 sits concentrically in the wall plug 1 and bears on the wall surface 50 with the flange surface facing the wall 5. A flat ring seal 3 is placed in the flange groove and forms a seal between the wall surface and the flange surface. The retainer 2 is screwed into the wall plug 1 until the securing section 13 that contains the target bending point 131 is spread out such that it bears firmly against the inner surface of the wall hole, and the wall plug 1 is clamped securely in the wall hole. As FIG. 8 shows in detail, the wall plug 1 and the retainer 2 can have a bevel at the front end surface in the second free end 12, 22, which facilitates the insertion of the respective components. The wall plug 1 is thicker in the region of the bevel and the internal threading 120 of the wall plug 1, in order to reinforce this region. The region of the securing section 13 is thinner in order to weaken the securing section 13 and thus facilitate its deformation. A flush-mounted fixture 4 is placed concentrically inside the retainer 2. The fixture has a housing 40 with a threading 41 with which it is screwed into the retainer 2. A sealing element 42 seals the outer surface of the flange 210 of the retainer against the interior of the flush-mounted fixture 4 in the installed state and thus prevents ingress of moisture into the interior of the fixture. A cable 6 is connected at the inner surface of the flush-mounted fixture 4, which is inserted into the interior of the retainer 2 as far as the flush-mounted fixture 4. The retainer 2 has a circumferential groove 224 on its inner surface in the region of the second free end 12. The groove 224 is designed such that a connector 8 with a latching element can be snapped into it. The connector 8 can be used for attaching an empty conduit 7.

Figure 9:
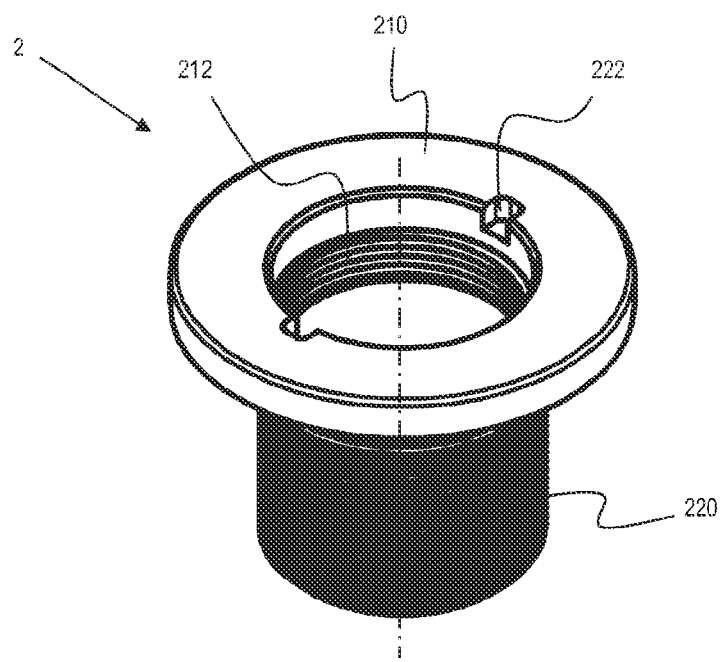
FIG. 9 shows a perspective view of another embodiment of a retainer.

FIG. 9 shows a perspective view of another embodiment of a retainer 2. The retainer has a front surface recess 222 in which a tool can engage, with which the retainer can be screwed into the wall plug. In the illustration there are two recesses lying opposite one another in relation to the longitudinal axis.

Figure 10:
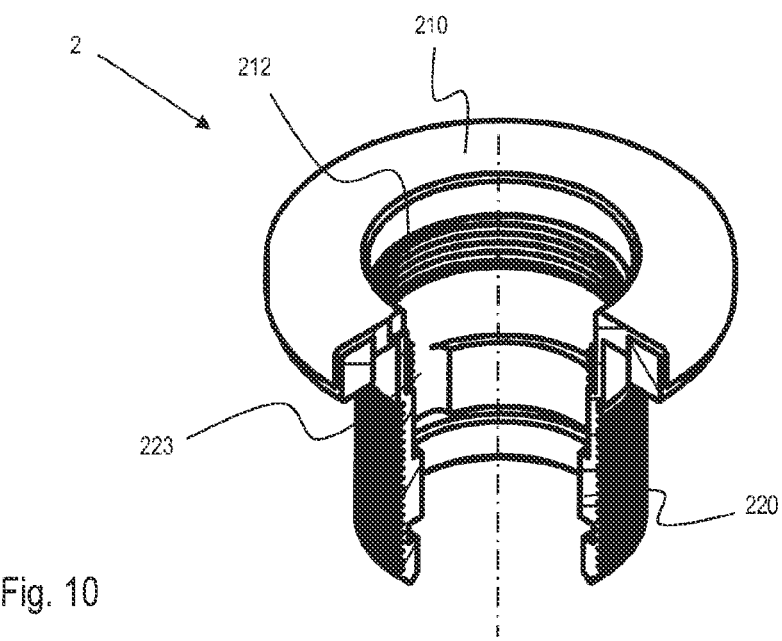
FIG. 10 shows a perspective partial view of another embodiment of a retainer.

FIG. 10 shows a perspective sectional view of another embodiment of a retainer 2. The retainer has an internal circumferential ledge, interrupted by recesses 223 located therein. A corresponding tool can engage in these recesses. Two opposing recesses are illustrated.

Figure 11:
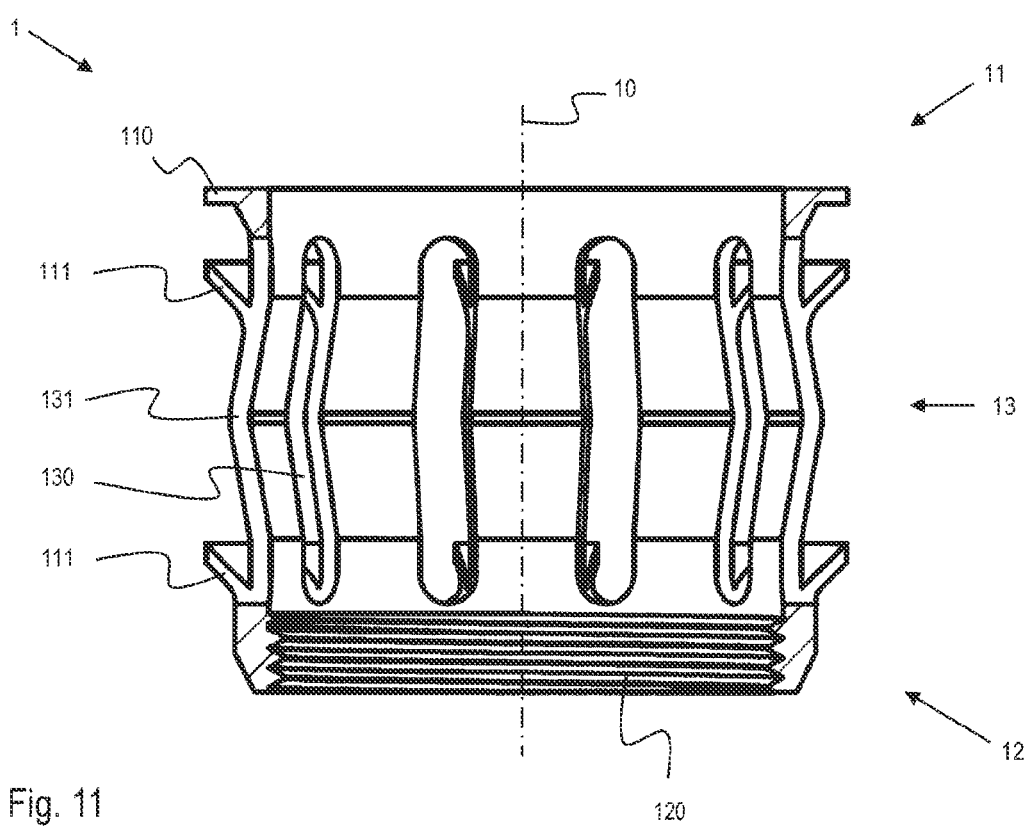
FIG. 11 shows a lateral sectional view of the wall plug shown in FIG. 6.

FIG. 11 shows a lateral sectional view of the wall plug 1 in FIG. 6. In differing from the embodiment of the wall plug shown in FIGS. 3 and 5, the flange 110 is divided into two parts. These are a disk-shaped first part that comprises the front surface of the wall plug 1, and an adjoining conical second part. The conical part extends from the disk-shaped part to the recesses 130 in the securing section 13. A first fin 111 is located on the outer circumference of the securing section, at a spacing to the ends of the recess 130, which face the first free end 11. The fin 111 is in the form of a collar and extends at an angle away from the circumference, toward the first free end 11. In the illustration, the angle is approximately 45°. The outer diameter of the fin 111 is substantially the same size as the outer diameter of the flange 110. A second fin 111 that is identical to the first fin 111 is located on the outer circumference adjoining the ends of the recesses that face the second free end 12. The wall plug has thicker walls in the region of the second free end 12 where the threading 120 is located than in the securing section 13. The wall thickness of the wall plug is substantially even in the securing section. The target bending point 131 is formed in the middle of the securing section 13. The outer diameter of the target bending point corresponds to the greatest diameter of the conical part of the flange 110. The circumference of the wall plug in the securing section 13 decreases from the target bending point 131 on both sides toward the first free end 11, and the second free end 12, respectively. The conical region extends over approximately two thirds of the length of the recesses 130.

Figure 12:
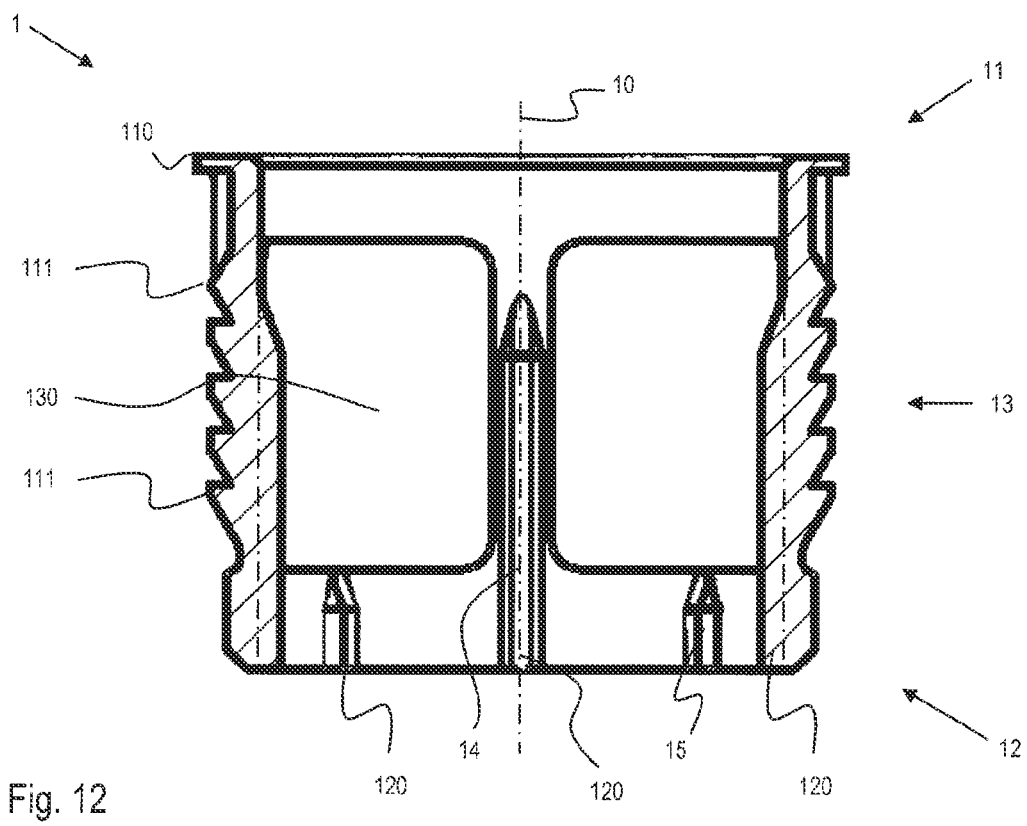
FIG. 12 shows a lateral sectional view of another embodiment of a wall plug.
Figure 13:
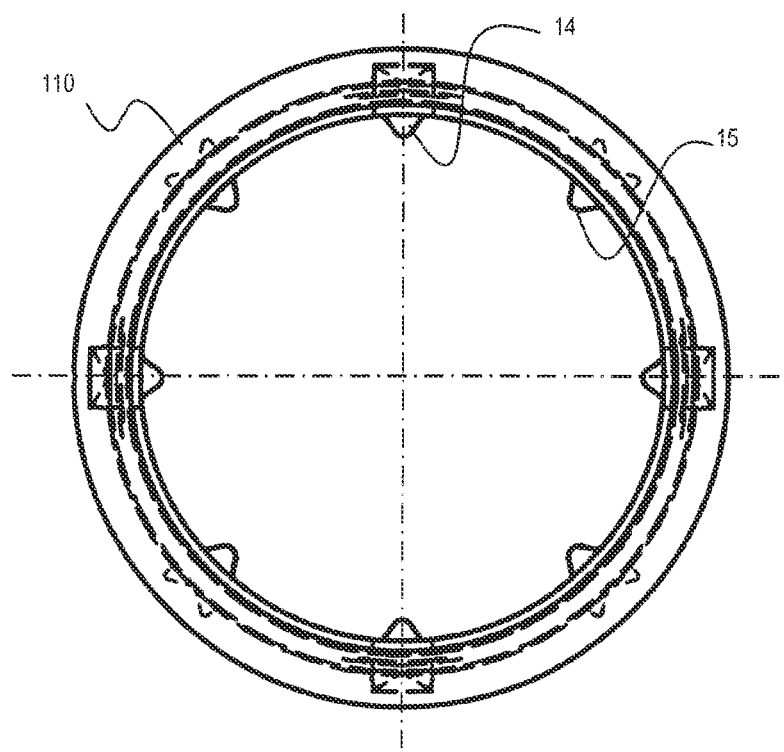
FIG. 13 shows a top view of the wall plug shown in FIG. 12.

FIG. 12 shows a lateral sectional view of another embodiment of a wall plug 1 and FIG. 13 shows a top view of the wall plug shown in FIG. 12. Identical elements are labeled with the same reference symbols. In differing from the embodiments shown in FIGS. 3 and 11, the recesses 130 in the securing section 13 are wider. Four wide recesses 130 are illustrated, which are separated from one another in the securing section 13 by narrow webs. The width of the recesses is a multiple of the width of the web, e.g. five, six, seven, or eight times the width of the web. Numerous evenly distributed fins 111 are located on the outer circumference of the securing section 13. The fins 111 are barb-shaped, and have a flat flank on their surfaces facing the second free end 12, and a steep flank on their opposite surface, such that they can function as a barb. As a result, the wall plug 1 can be inserted easily into a hole. When pulled out, the fins form a resistance, and the wall plug can only be removed from the hole with a great deal of effort. The wall plug has internal fins 14, 15 on its internal surface, wherein long fins 14 are located in the region of the webs, which extend from the second free end 12 from past one half of the length of the wall plug to near to the first free end 11. Long fins 14 are illustrated that extend over two thirds of the length of the wall plug. Short fins 15 are located between the long fins 14 in the region of the second free end 12. Four short fins 15 are illustrated, which are distributed evenly over the circumference between four long fins 14. The short fins 15 extend from the front end of the wall plug at the second free end 12 to the recesses 130. The long and short fins have a threading, or a thread segment on their inward facing surfaces. Alternatively, the fins do not have a threading when the wall plug is new. The threading is first generated when screwed into the retainer. For this, the corresponding threading in the retainer has sharp edges, such that the wall plug material in the region of the long and short fins can be cut away or pushed away. The inner diameter of the threading 120 or the clearance between two opposing long or short fins is selected such that it or they is/are somewhat smaller than the outer diameter of the threading on a corresponding retainer that is to be screwed therein. As a result, the wall plug 1 already spreads out when it is screwed into the retainer, and increases the clamping effect in the hole. If the retainer is screwed in further, the resistance increases when the retainer engages with the threading in the short fins 15. When rotated further, the second free end 12 is twisted about the first longitudinal axis 10 in relation the first free end 11. As a result, the securing section 13 is compressed, and the clamping effect is further increased. If it is turned further, the threading in the region of the securing section 13 is lifted away from the threading in the retainer, and the retainer only remains engaged with the wall plug in the region of the second free end 12. Such a wall plug can be used with solid walls or hollow walls.

| List of Reference Symbols | |
|---|---|
| 1 | wall plug |
| 10 | first longitudinal axis |
| 11 | first free end |
| 110 | flange |
| 111 | fin |
| 12 | second free end |
| 120 | threading |
| 13 | securing section |
| 130 | recess |
| 131 | target bending point |
| 14 | long fin |
| 15 | short fin |
| 2 | retainer |
| 20 | second longitudinal axis |
| 21 | first free end |
| 210 | flange |
| 211 | groove |
| 212 | threading |
| 22 | second free end |
| 220 | threading |
| 221 | hexagonal socket |
| 222 | recess |
| 223 | recess |
| 224 | groove |
| 3 | seal |
| 4 | fixture |
| 40 | housing |
| 41 | threading |
| 42 | seal |
| 5 | wall |
| 50 | surface |
| 6 | cable |
| 7 | empty conduit |
| 8 | connector |

The invention claimed is:

1. An installation device for installing flush-mounted fixtures (4) on/in a wall (5), wherein the installation device comprises a wall plug (1) and a retainer (2) that can be screwed therein, characterized in that the wall plug (1) has a sleeve-shaped body extending along a first longitudinal axis (10) that has a first free end (11), an opposite, second free end (12), and a securing section (13) lying therebetween, wherein a first front end limit stop (110) is provided on the first free end (11) of the wall plug (1), and wherein a first tightening element (120) is provided on the second free end (12) of the wall plug (1), in that the retainer (2) has a sleeve-shaped body extending along a second longitudinal axis (20) that has a first free end (21) and an opposite, second free end (21), wherein a second limit stop (210) is provided on the first free end (21) facing toward the second free end (22), and wherein a second tightening element (220) is provided on the second free end (22), wherein the first limit stop (110) and the second limit stop (210) form a pair of limit stops, and wherein the first tightening element (120) and the second tightening element (220) form a pair of tightening elements, wherein the securing section (13) is configured such that a relative rotation between the wall plug (1) and the retainer (2) in a first direction of rotation leads to a reduction in the distance between the first free end (11) and the second free end (12) of the wall plug (1), and that a relative rotation between the wall plug (1) and the retainer (2) in a second direction of rotation, opposite the first direction of rotation, leads to an increase in the distance between the first free end (11) and the second free end (12) of the wall plug (1).

2. The installation device according to claim 1, wherein the wall plug (1) and/or the retainer (2) have a cylindrical sleeve-shaped body.

3. The installation device according to claim 1, wherein the outer contour of the second free end (22) of the retainer (2) is smaller than the inner contour of the first free end (11) and the securing section (13) of the wall plug (1).

4. The installation device according claim 1, wherein the first limit stop (110) of the wall plug (1) has a flange facing outward in relation to the first longitudinal axis (10).

5. The installation device according to claim 1, wherein fins (111) are located adjacent to the first free end (11) of the wall plug (1), which extend along the first longitudinal axis (10) and/or transverse to the first longitudinal axis (10), and/or in another arbitrary direction.

6. The installation device according to claim 1, wherein there are recesses (130) in the securing section (13) of the wall plug (1), which extend along the first longitudinal axis (10) and/or transverse to the first longitudinal axis (10), and/or in another arbitrary direction, and which are distributed on the circumference of the wall plug (1).

7. The installation device according to claim 1, wherein there is at least one target bending point (131) with a local curvature and/or local material thinning and/or another material in the securing section (13) of the wall plug (1).

8. The installation device according to claim 1, wherein the second limit stop (210) of the retainer (2) has a flange directed outward in relation to the second longitudinal axis (20).

9. The installation device according to claim 8, wherein there is a groove (211) for a seal (3) in the flange (210) of the retainer (2) on its side facing the second free end (22).

10. The installation device according to claim 1, wherein there is a fastener (212) for a flush-mounted fixture (4) on the first free end (21) of the retainer (2).

11. The installation device according to claim 1, wherein the pair of tightening elements forms a threaded connection or a bayonet socket connection.

12. The installation device according to claim 1, wherein there is a flange with an hexagonal socket (221) on the second free end (22) of the retainer (2) that extends inward in relation to the second longitudinal axis (20).

13. An installation system for installing a device according to claim 1 on a wall (5) and a flush-mounted fixture (4) located therein.

14. An installation method for a device according to claim 1 on a wall, comprising the steps:
 inserting the wall plug (1) into a recess in a wall (5);
 placing the retainer (2) in the wall plug prior to inserting the wall plug (1) into the recess in the wall (5); and
 rotating the retainer (2) in relation to the wall plug (1), resulting in a reduction in the distance between the first free end (11) and the second free end (12) of the wall plug (1).

\* \* \* \* \*